United States Patent [19]

Machuque

[11] 4,217,083
[45] Aug. 12, 1980

[54] EXTRUSION HEAD

[75] Inventor: Jean H. J. Machuque, Asnieres, France

[73] Assignee: Diepal Corporation, Rhone, France

[21] Appl. No.: 885,556

[22] Filed: Mar. 13, 1978

[30] Foreign Application Priority Data

Mar. 16, 1977 [FR] France .................. 77 08596

[51] Int. Cl.$^2$ .............................................. A21C 3/04
[52] U.S. Cl. .................................. 425/198; 99/509; 99/537; 425/199; 425/204; 425/376 R; 425/382 R; 425/463
[58] Field of Search ............... 425/463, 376 A, 464, 425/376 R, 382 R, 204–206, 198, 380, 377, 378 R, 199; 426/488, 496; 99/509, 537

[56] References Cited

U.S. PATENT DOCUMENTS

| 1,441,642 | 1/1923 | Tofanelli | 425/464 |
| 2,408,713 | 10/1946 | Webb | 425/464 |
| 2,791,187 | 5/1957 | Ambrette | 425/463 |
| 2,838,011 | 6/1958 | Braibanti et al. | 425/463 |
| 3,054,677 | 9/1962 | Graham, Jr. et al. | 425/376 R |
| 3,305,893 | 2/1967 | Machen | 425/376 R |
| 3,462,277 | 8/1969 | Reinhart | 425/464 |
| 4,088,433 | 5/1978 | Simpson | 425/382 R |
| 4,104,015 | 8/1978 | Meyer | 425/464 |

FOREIGN PATENT DOCUMENTS 1250840  12/1960  France ........................ 425/198

Primary Examiner—Jeffery R. Thurlow
Attorney, Agent, or Firm—Brumbaugh, Graves, Donohue & Raymond

[57] ABSTRACT

Dough is extruded from a screw extruder through a nozzle, preferably a twin-slot nozzle, and an apertured blocking plate is placed between the tip of the extrusion screw and the nozzle assembly for making the pressure distribution across the dough in a pressure equilization chamber between the blocking plate and the nozzle more uniform and for controlling the rate of flow of the dough towards the extrusion nozzle slots. The blocking plate has two series of parallel channels arranged on two opposed arcs of the same circle centered on the central axis of the nozzle (the axis of the extrusion screw) and the series are symmetrical about a plane of symmetry of the nozzle.

9 Claims, 12 Drawing Figures

U.S. Patent  Aug. 12, 1980  Sheet 1 of 4  4,217,083
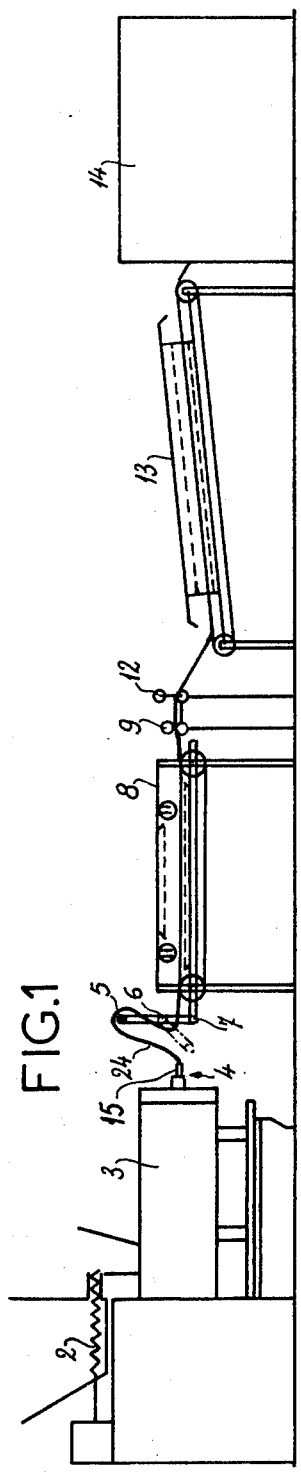
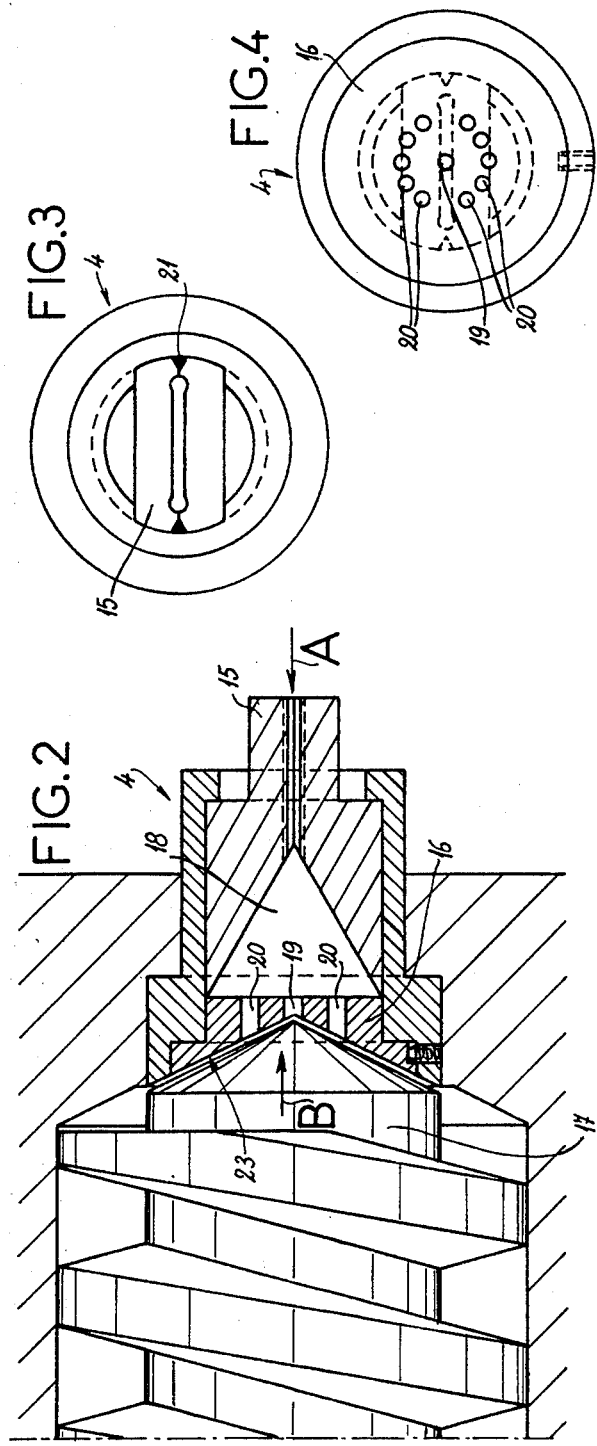

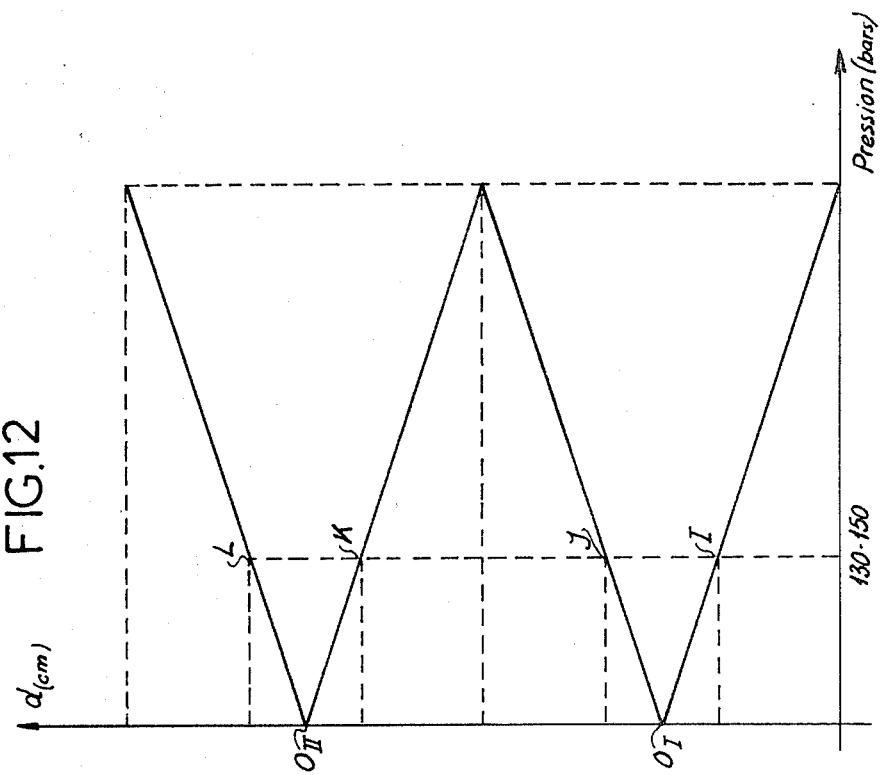
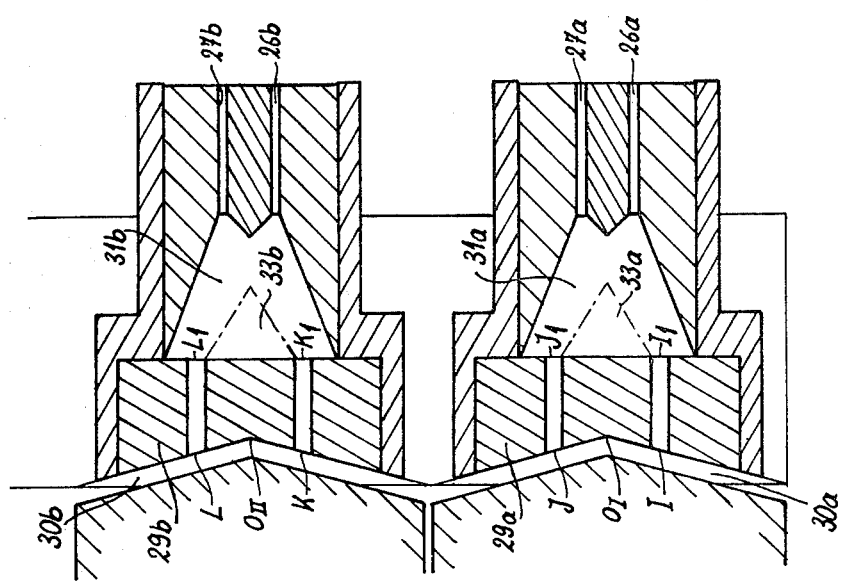

EXTRUSION HEAD

The invention relates to an extrusion head intended more particularly, but not exclusively, for equipping a line for the manufacture of products in strip form, by the baking-extrusion-expansion process.

Extrusion assemblies currently used for carrying out this process are known; they generally comprise a feed hopper equipped with a mixer and a metering pump, which introduces the mixture of the constituents into a heated barrel equipped with a device comprising one or two rotating screws and terminating in one or more nozzles which are characteristic of the shape which it is desired to impart to the finished product.

In these assemblies, the pressure imparted to the doughy product in the screws of the extruder, further increased by progressive reduction in the pitch of the screw from where the mixture of the constituents enters to where it leaves, imparts to the doughy material pushed by the screw or the two screws a rotary movement in the chamber located between the conical tips of the or each screw and the front plate of the extruder. This rotary movement results, at the outlet of the extrusion nozzle, in a relatively disordered distribution of the dough over its entire cross-section.

Thus in the case where the extruded product is to be manufactured in the form of a strip, by virtue of its having been extruded through a slot, it is found that the edge portions of this strip are thinner and that there are surface irregularities which persist after cooling and interfere both with the appearance of the finished product and with the achievement of satisfactory packaging, because of the lack of planarity of the slabs obtained after the strip has been cut.

Many extruders have, in a position between the tip of the extrusion screw and the chamber preceding the nozzle, a perforated element which acts as a flow breaker plate and is intended to increase both the shearing action and the back pressure. Such flow breaker plates are described, for example, in U.S. Pat. No. 2,543,679 (issued Feb. 27, 1951 to Jurian W. Van Riper), U.S. Pat. No. 3,018,807 (issued Jan. 30, 1962 to James W. Clinefelter), U.S. Pat. No. 3,054,677 (issued Sept. 18, 1962 to William R. Graham Jr., and Benjamin Grogg), U.S. Pat. No. 3,284,848 (issued Nov. 15, 1966 to Richard M. Rice), and U.S. Pat. No. 3,462,277 (issued Aug. 19, 1969 to Robert R. Reinhart), as well as in British Pat. No. 1,213,455 (issued to Plasticizers Limited). The perforations of these flow breaker plates are either distributed over the entire surface of the plate or arranged uniformly along one or more concentric circles, or arranged aligned relative to one another. However, these flow breaker plates employed alone do not make it possible to achieve perfect equalisation of the speed of the dough; to achieve this result it is still necessary to modify the shape of either the pressure chamber which precedes the flow breaker plate or the chamber located between this plate and the extrusion nozzle.

A device described in French Pat. No. 1,250,844 (issued to Diversey France) makes it possible to render the flow of dough uniform by means of plano-concave or plano-convex perforated lens-shaped bodies. Because of the concavity or convexity of the compensator described in this patent, the perforations form passages of differing lengths, depending on their position relative to the axis of the screw, and the strands of dough passing through each of these perforations thus undergo different pressure losses.

The present invention provides an extrusion head for an extruder having two co-rotating screws, comprising a grid which is located between the tip of each screw of the extruder and the respective pressure equalising chamber and consists of two series of parallel channels, all located at the same radial distance from the central axis of the extrusion nozzle and arranged symmetrically relative to a median plane of the said nozzle along two opposite arcs of a single circle.

This grid, which acts as a diffuser, is located downstream of the compression chamber and upstream of the pressure equalising chamber. It fulfills two specific purposes:

On the one hand, it arrests the rotary movement imparted to the doughy product by the extruder screw and converts it to a linear translational movement towards the nozzle orifice or orifices and, on the other hand, by virtue of the arrangement of the channels all located on the same circle, maintains constant the linear speed imparted to the strands of dough passing through these channels which channels are all located in zones of equal pressure. After having passed through the channels, these strands of dough merge together again in the chamber located after the diffuser grid, and give a sheet of homogeneous dough which, after extrusion, results in a uniform product.

In order to avoid the presence of a zone where the product stagnates in the pressure equalising chamber, the grid advantageously has a central channel located along the axis of the extrusion nozzle.

In the case where two nozzle orifices are located at the end of each screw, said two series of parallel channels are all located at the same distance from the axis of the plane of symmetry passing between the two nozzle orifices and are arranged symmetrically relative to the said plane of symmetry.

Because of this arrangement the central channel of the diffuser grid, which serves to avoid the stagnation of the doughy product which could lead to blocking of the nozzle orifice, is omitted because a dead zone will form behind the centre of the diffuser grid and this dead zone will be devoid of doughy product and will thus not present any danger of stagnation of the dough.

Hence, at the extruder outlet, an incurved strip of uniform thickness across its entire cross-section is obtained, and this strip does not need to be spread by means of a conical metal piece, as is generally the case in conventional extrusion devices, more especially where these devices comprise an annular nozzle orifice or a nozzle orifice in the shape of a sector of a ring.

The extrusion nozzle orifice or orifices located downstream from the grid will advantageously have the shape of one or more slots.

In the particular case of nozzle orifices in the form of a slot, an incurved strip devoid of longitudinal streaks or surface irregularity will be obtained by virtue of the diffuser grid. In order to ensure that this strip is of uniform thickness over its entire cross-section, it is advantageous to make the nozzle orifice in the form of a slot which has lateral enlargements. This avoids a loss of pressure and a slowing down of the dough flow at the two ends of the nozzle slot, which would lead to a thinning of the edges of the extruded product.

The extrusion nozzle orifices can also have other shapes such as a semi-circular shape, a cruciform shape, a lozenge shape.

The components which constitute the extrusion head are in the form of one block, regardless of whether they are made in one piece or assembled by welding.

The extrusion head may advantageously and alternatively consist of two separate symmetrical components assembled by means of a sleeve and detachable fixing straps. This arrangement greatly facilitates the cleaning of the head and more especially of the nozzle orifice.

The grid occupies a fixed position in the extrusion head but is not permanently fixed thereto; instead, it is detachably fixed thereto by means of straps.

The extrusion in which the extrusion head according to the invention is incorporated may advantageously include, downstream from the nozzle, one or more tension bars which are adjustable and pivotable about a common axis or different axes, for example by being mounted on a pivot shaft or shafts.

This pivotable tension bar, which is located on the side of a drying tunnel at which the heating element of the drying tunnel is disposed, makes it possible to work the extruded strip by raising its side edges and thus ensures perfect uniformity of the product obtained after toasting. The pivotable tension bars are preferably arranged staggered above one another.

In order that the present invention may be better understood the following description is given, merely by way of example, with reference to the accompanying schematic drawings in which:

FIG. 1 is a schematic view of a manufacturing line which in accordance with the invention, is equipped with the extrusion head and the tension bar, is especially suitable for the manufacture of bread slices or toast by the baking-extrusion-expansion process;

FIG. 2 is a longitudinal section of an embodiment of the extrusion head according to the invention, which can be fitted onto the end of the extruder;

FIG. 3 is a front elevation along the arrow A of FIG. 2;

FIG. 4 is a rear elevation along the arrow B of FIG. 2;

FIG. 11 is a schematic longitudinal section of the end of the extruder, of the type equipped with two heads as illustrated in FIG. 8; and FIG. 12 is a diagram of the pressure of the flow of dough as a function of the distance from the centre.

Figure 5:
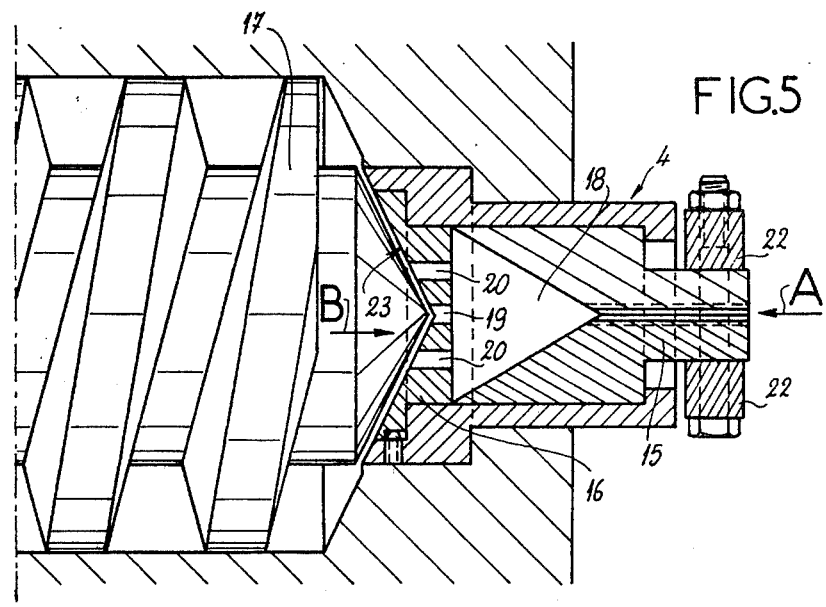
FIGS. 5, 6 and 7 show another embodiment of the extrusion head according to the invention.

The manufacturing line shown in FIG. 1 is of the conventional type comprising a metering screw 2, an extruder 3 of the co-rotating twin-screw type, of which at least one of the two screws is equipped with the extrusion head 4 according to the present invention, two pivotable tension bars 5 and 6 according to the invention, a drying tunnel 8, a pair of sheeting rollers 9, a rotating knife cutting device 12, a toasting tunnel 13 and packaging devices 14 of a known type which are not shown in detail in the Figure.

FIGS. 2, 3 and 4 show details of one form of extrusion head 4 in accordance with the invention, and FIG. 2 shows the head 4 fitted onto the end of the extruder 3. The head comprises, upstream from the extrusion nozzle 15, a diffuser grid 16 located in an intermediate position in the front chamber between the tip of one of the screws 17 of the extruder 3 and the pressure equalising chamber 18.

This grid 16 has two series of channels 20 arranged symmetrically relative to the median plane of the extrusion nozzle 15 all with their axes parallel, and all located at the same distance from the axis of the nozzle 15, along circular arcs shown in FIG. 4.

Furthermore the grid 16 has a central channel 19 located along the axis of the extrusion nozzle 15.

FIGS. 8, 9, 10 and 11 show details of an extrusion head 25 which can be fitted onto the end of an extruder, where two nozzles are located at the end of each extruder screw.

This head comprises, upstream from the two extrusion nozzles 26 and 27, a diffuser grid 29 located in an intermediate position in the front chamber or compression chamber 30 between the tip of one of the two screws 28 of the co-rotating twin-screw extruder and the pressure equalising chamber 31. This diffuser grid 29 has two series of channels 32 arranged symmetrically relative to the plane of symmetry of two nozzle slots 26 and 27 of the nozzle 15 all with their axes parallel, and all located at the same distance from the plane of symmetry between the two nozzle slots (i.e. the horizontal plane of symmetry of the nozzle 15), along circular arcs shown in FIG. 9.

In contrast to the grid shown in FIGS. 2, 3 and 4, this grid does not have a central channel located along the axis of the plane of symmetry of the two nozzles.

In fact, in the head illustrated in FIGS. 2 to 4, the presence of this central channel was necessary in order to avoid creating, opposite the single nozzle slot, a stagnation zone in the pressure equalising chamber, and thereby to avoid a possible blockage of the nozzle slot by an accumulation of doughy product resulting from this stagnation. By contrast, the head of FIGS. 8, 9, 10 and 11 has the end of each co-rotating screw of the extruder equipped with at least two nozzles. Two dead zones 33a, 33b (FIG. 11) form in the pressure equalising chambers 31a, 31b, at the centre of the diffuser grids 29a, 29b, and in these dead zones no dough will be situated so no stagnation whatsoever of the doughy material can take place.

In the embodiment shown in FIGS. 2, 3 and 4, the constituent parts of the extrusion head are in the form of one block, regardless of whether they are made in one piece or assembled by welding.

The grid 16 occupies a fixed position in the extrusion head 4, but it is not integral with this head since it is instead fixed thereto by straps or any other fixing means 21.

Figure 6:
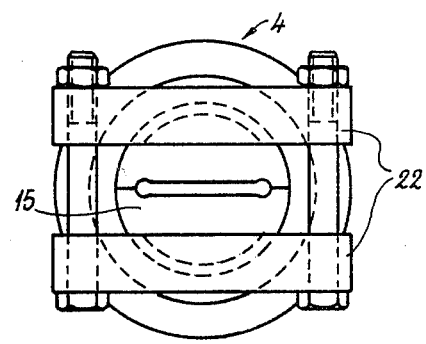
Figure 7:
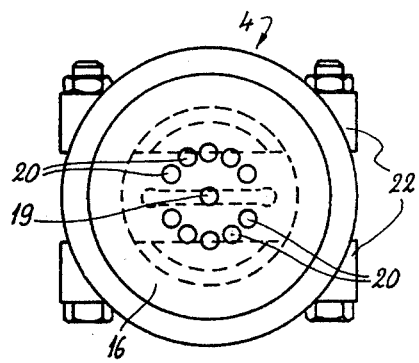
Figure 8:
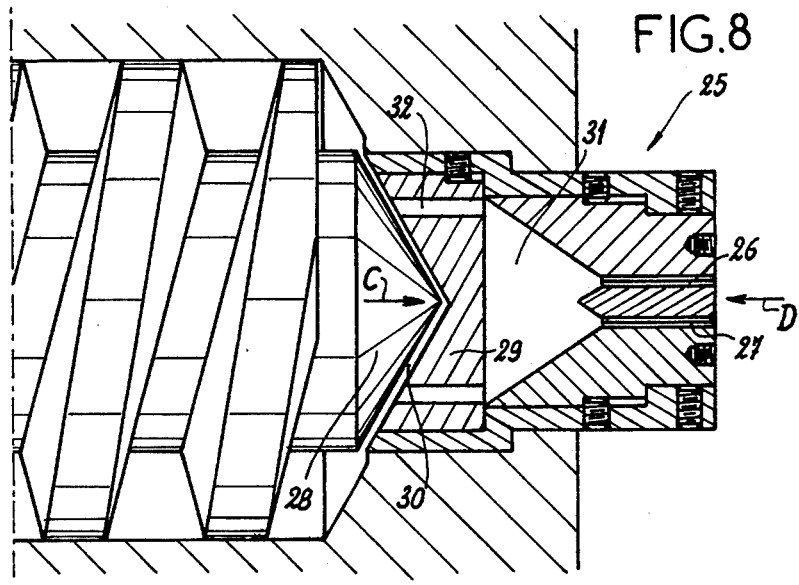
FIG. 8 is a longitudinal section of an extrusion head according to the invention, in the case where two nozzles are arranged at the end of each screw.

In another embodiment shown in FIGS. 5, 6 and 7, the extrusion head 4 consists of two separate components held together by a sleeve and detachable fixing straps 22. This embodiment greatly facilitates cleaning of the head and especially of the nozzle 15. The grid 16 again occupies a fixed position in the extrusion head, but is not integral therewith.

In all the embodiments, the whole of the apparatus, from the mixer to the extruder outlet, is heated by induction (Foucault current) so as to reach the appropriate temperatures for the mixture to be extruded.

The pulverulent constituents of the mixture to be extruded are mixed in a milling mixer (not shown) before being introduced into the metering screw 2 of the extruder 3; at the same time the amount of water required is supplied by means of a metering pump (not shown). Malaxating discs (not shown) are located, in a manner which is in itself known, upstream from the screws of the extruder 3 and permit good mixing of the pulverulent products and the water, and thus ensure uniform hydration of the combined constituents of the product to be extruded.

The pitch of the screw of the extruder decreases, again in a manner which is in itself known, from the inlet towards the outlet of the apparatus, so as gradually to increase the pressure on the product to be extruded. Counter-threads (threads having a converse pitch and with flights broken) of a conventional type (not shown) are located downstream from the screws and upstream from the front chamber of the extruder, so as to avoid stagnation of the products, which would cause irregularities in the extruded product.

The stream of dough or other similar material is forced, by the rotary movement imparted to it by the screw 17 or by the two co-rotating extruder screws 28a and 28b, into the space located between the male cone or cones which form the ends of the screws and the female cone or cones of the diffuser grid 16, or of each of the diffuser grids 29a and 29b. In the case shown in FIG. 11, this space constitutes for each screw the compression chamber 30a, 30b respectively.

The tips of the screws thus impart a certain pressure to the doughy product in the region of this compression chamber, the isobaric curves being concentric circles centered on the axis of the respective screw.

The plot of pressure as a function of the radial distance, shown in FIG. 12, enables this phenomenon to be better understood.

The channels of the grid 29a, 29b, located at I, J, K and L all receive a doughy product which is at a pressure of about 150 bars. Since the path lengths travelled by the strands of dough which pass through these channels are identical, the pressure losses are also identical for these four strands. At $I_1$, $J_1$, $K_1$ and $L_1$, these strands are subjected to the same pressure and thus have the same speed. On leaving the channels of the grid, all the strands I, J, K and L again merge together and pass through the respective nozzle slots 26a, 27a, 26b and 27b, resulting in the production of perfectly flat strips which exhibit neither longitudinal streaks, nor surface irregularities, nor sag.

The rotary movement imparted to the dough by the screws is thus arrested and converted to a linear movement, and the linear speed imparted to each strand of dough issuing from the channels of the diffuser grid is the same for all the strands.

The particular arrangement of the nozzle slots furthermore makes it possible to guarantee that the strip extruded from nozzle 26a, 26b, 27a or 27b has a uniform thickness over its entire width. As can in fact be seen from the nozzles shown in FIG. 10, the slots which form the two nozzle slots 26 and 27 are provided with lateral enlargements 34 and 35. This arrangement makes it possible to avoid a localised pressure loss and a slowing down of the dough flow at the two ends of the nozzle slot, which would otherwise result in thinning of the edges of the extruded dough.

Figure 9:
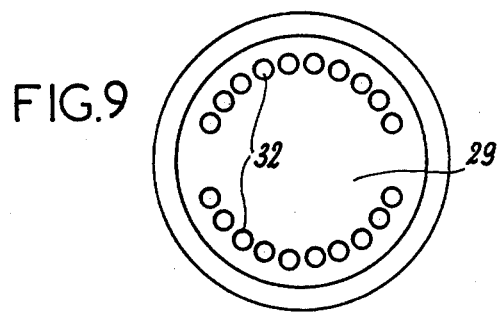
FIG. 9 is a rear elevation along the arrow C of FIG. 8.
Figure 10:
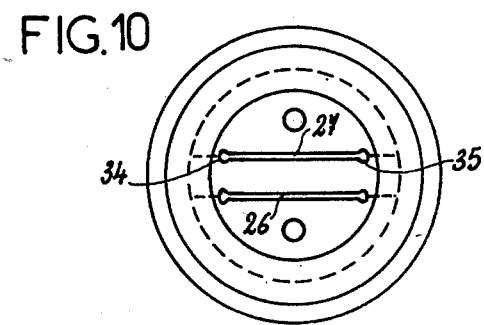
FIG. 10 is a front elevation along the arrow D of FIG. 8.

In fact the nozzle extrusion slot, for example the nozzle slot 27, receives the strands of dough issuing from the ten channels 32 arranged in an arc of a circle across the lower part of the diffuser grid shown in FIG. 9. As has already been mentioned, these strands, all issuing at the same speed from the channels 32, merge together again in the pressure equalising chamber 31 before being extruded through the nozzle slot 26. When they pass through the nozzle slot, these ten strands all have an identical coefficient of friction with the upper and lower walls of the nozzle slot, if, in contrast, this nozzle slot had a uniform depth, the two strands of dough located in the extreme position would additionally undergo friction against the side walls of the nozzle slot and a pressure drop, and slowing down at the two ends, would thus occur.

It is to avoid this disadvantage that the passage of the two strands located in the extreme positions is assisted by equipping the two ends of each nozzle slot 26, 27 (FIG. 10) with lateral enlargements 34 and 35, which ensure that the two strands in the extreme positions have a passage cross-section larger than that of the other strands.

The next operations subsequent to the extrusion are shown schematically in FIG. 1. The extruded dough next issues through the nozzle 15 in the form of a continuous strip 24 which is still doughy and is curved upwardly convex as viewed in transverse cross-section. It then passes under the tension bar 6 and is immediately taken up by the conveyor belt of the drying tunnel 8 while the pivotable tension bar 5 is in the low position (shown in broken lines in FIG. 1). The bar 5 is then raised, by pivoting it on shaft 6 to bring it to an operating position close to the vertical, this operating position being capable of variation in accordance with the desired tension which will itself depend on the plasticity of the doughy strip. The strip 24 then follows the path shown in solid lines in FIG. 1.

Where it is not considered necessary to subject the strip to any tension whatsoever on leaving the extrusion head 4, the tension bars 5, 6 will be pivoted so as to bring them into a position level with shaft 7.

After passing through the drying tunnel 8, the strip passes between the two sheeting rollers 9 and is then cut into slabs of the desired size by the rotating knife 12. The cut slabs then pass through the toasting tunnel 13. Finally, they are cooled on the conveyor belt, by the action of a stream of cold air, before being conditioned and packaged in the conventional manner.

I claim:

1. In an extruder wherein a dough mixture is supplied under pressure from an extrusion screw rotating about its central longitudinal axis through an extrusion head to a nozzle, said screw having a conically shaped tip, the improvement comprising:

a diffuser grid mounted within said extrusion head and between said tip and the nozzle, wherein there is provided a pressure equalizing chamber between said grid and said nozzle, said grid having a substantially planar surface facing said nozzle and an inwardly conical surface facing said tip, the conical surface of the grid having a cone angle substantially the same as said tip and defining a compression chamber between said tip and said grid, and wherein said grid consists of two series of parallel channels, all channels located at the same radial distance from the longitudinal axis of the screw and arranged symmetrically relative to a median plane of the nozzle along opposite arcs of a single circle centered on the longitudinal axis of the screw for imparting a uniform linear speed to the strands of dough passing through the respective channels.

2. A device according to claim 1, wherein said diffuser grid further has a central channel located at the midpoint between the series of parallel channels and at the central axis of the nozzle.

3. A device according to claim 2, wherein the nozzle opening is in the form of a generally rectangular elongated slot.

4. A device according to claim 3, wherein said opening has enlarged portions longitudinally-extending along the side edges.

5. A device according to claim 1, wherein said nozzle has a pair of parallel openings, said openings being symmetrical with respect to the median plane of said nozzle.

6. A device according to claim 5, wherein said nozzle openings are in the form of generally rectangular elongated slots.

7. A device according to claim 6, wherein said openings have enlarged portions longitudinally-extending along the side edges.

8. A device according to claim 1, comprising a second extrusion screw co-rotating with the first screw, said second screw having a conically shaped second tip and arranged to supply dough under pressure through the extrusion head to a second extrusion nozzle, and a second diffuser grid mounted within the extrusion head between the tip of the second screw and the second nozzle, wherein there is provided a pressure equalization chamber between the second grid and second nozzle, said second grid having a substantially planar surface facing said nozzle and an inwardly conical surface facing said second tip, the conical surface of said second grid having a cone angle substantially the same as said second tip and defining a compression chamber between said second tip and said second grid, and wherein said second grid consists of two series of parallel channels, all channels located at the same radial distance from the longitudinal axis of the second screw and arranged symmetrically relative to a median plane of the second nozzle along opposite arcs of a single circle centered on the longitudinal axis of the second screw for imparting a uniform linear speed to the strands of dough passing through the respective channels of the second grid.

9. A device according to claim 8, wherein said diffuser grid and said second grid further have a central channel, each said central channel located at the midpoint between the series of parallel channels and at the central axis of the nozzle.

* * * * *